(12) United States Patent
Barkai et al.

(10) Patent No.: US 9,124,754 B2
(45) Date of Patent: *Sep. 1, 2015

(54) SYSTEM AND METHOD FOR POSITION CALIBRATION OF A SPOT OF AN OPTICAL SENSOR

(75) Inventors: Nadav Barkai, Ramat Gan (IL); Lior Katz, Raanana (IL); Gal Amit, Bat Yam (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/123,005

(22) PCT Filed: Jun. 8, 2011

(86) PCT No.: PCT/EP2011/059500
§ 371 (c)(1),
(2), (4) Date: Nov. 27, 2013

(87) PCT Pub. No.: WO2012/167825
PCT Pub. Date: Dec. 13, 2012

(65) Prior Publication Data
US 2014/0092402 A1    Apr. 3, 2014

(51) Int. Cl.
*H04N 1/047* (2006.01)
*H04N 1/00* (2006.01)
*H04N 1/60* (2006.01)

(52) U.S. Cl.
CPC .......... *H04N 1/047* (2013.01); *H04N 1/00002* (2013.01); *H04N 1/0005* (2013.01); *H04N 1/00018* (2013.01); *H04N 1/00034* (2013.01); *H04N 1/00045* (2013.01);
(Continued)

(58) Field of Classification Search
None
See application file for complete search history.

(56) References Cited

U.S. PATENT DOCUMENTS

| 3,970,393 | A | * | 7/1976 | Krygeris et al. | 356/425 |
| 4,671,661 | A | * | 6/1987 | Ott | 356/402 |
| 5,642,202 | A | * | 6/1997 | Williams et al. | 358/406 |

(Continued)

FOREIGN PATENT DOCUMENTS

| EP | 1006712 A1 | 6/2000 |
| EP | 1006712 A1 * | 6/2000 | ............... H04N 1/60 |

(Continued)

OTHER PUBLICATIONS

International Searching Authority, International Search Report and Written Opinion, PCT/EP2011/059500, 11 pages, Dec. 13, 2011.
(Continued)

*Primary Examiner* — Chuong A Ngo
*Assistant Examiner* — Edwin S Leland, III

(57) ABSTRACT

A method for position calibration of a spot of a known geometry of an optical sensor is disclosed. The method may include providing a position calibration patch on a sheet at a position which is known with respect to a reference position on the sheet, along a scan path of the spot of the optical sensor across the sheet. The patch may include at least two adjacent blocks of different colors. The method may also include obtaining a sampling of the position calibration patch using the optical sensor. The method may further include determining from the sampling a relative coverage of the spot over the color blocks of the position calibration patch, and based on the known geometry of the spot and on the determined relative coverage, determining the position of the spot of the sensor with respect to the reference position.

20 Claims, 3 Drawing Sheets

(52) U.S. Cl.
CPC ...... *H04N 1/00063* (2013.01); *H04N 1/00087* (2013.01); *H04N 1/6033* (2013.01); *H04N 1/6044* (2013.01)

(56) References Cited

U.S. PATENT DOCUMENTS

| | | | | |
|---|---|---|---|---|
| 6,178,007 | B1* | 1/2001 | Harrington | 358/1.9 |
| 6,351,308 | B1 | 2/2002 | Mestha | |
| 6,474,767 | B1* | 11/2002 | Teshigawara et al. | 347/19 |
| 6,873,431 | B1* | 3/2005 | Kohler et al. | 358/1.9 |
| 7,027,185 | B2* | 4/2006 | Subirada et al. | 358/1.9 |
| 7,177,558 | B2* | 2/2007 | Tanaka et al. | 399/39 |
| 7,394,540 | B2* | 7/2008 | Lekson et al. | 356/405 |
| 7,477,420 | B2* | 1/2009 | Friedman et al. | 358/1.9 |
| 7,537,304 | B2* | 5/2009 | Wu et al. | 347/19 |
| 7,676,166 | B2* | 3/2010 | Saida et al. | 399/49 |
| 7,800,779 | B2* | 9/2010 | Fan et al. | 358/1.9 |
| 8,736,905 | B2* | 5/2014 | Barkai et al. | 358/1.9 |
| 2005/0030601 | A1* | 2/2005 | Smith et al. | 358/504 |
| 2005/0134961 | A1* | 6/2005 | Beisch et al. | 359/518 |
| 2006/0120597 | A1* | 6/2006 | Tan et al. | 382/162 |
| 2006/0158472 | A1* | 7/2006 | Endo | 347/14 |
| 2007/0291291 | A1* | 12/2007 | Vilar et al. | 358/1.9 |
| 2010/0002266 | A1* | 1/2010 | Takahashi et al. | 358/3.06 |
| 2011/0122455 | A1* | 5/2011 | Elliot et al. | 358/406 |
| 2012/0019875 | A1* | 1/2012 | Hoover et al. | 358/474 |
| 2012/0120143 | A1* | 5/2012 | Amit et al. | 347/19 |
| 2012/0314232 | A1* | 12/2012 | Barkai et al. | 358/1.9 |

FOREIGN PATENT DOCUMENTS

| | | |
|---|---|---|
| JP | 2657914 A | 6/1988 |
| JP | 2000122184 A | 4/2000 |
| JP | 2003251790 A | 9/2003 |
| JP | 2005059493 A | 3/2005 |

OTHER PUBLICATIONS

Examination Report, May 11, 2015, European Patent Office, Application No. 11729392.8, Hewlett-Packard Indigo B.V., et al.

* cited by examiner

SYSTEM AND METHOD FOR POSITION CALIBRATION OF A SPOT OF AN OPTICAL SENSOR

BACKGROUND

Today, most digital presses rely on an optical sensor for calibrating colors, and since different types of sensors measure different types of data, the type of the optical sensor is usually linked to the method of the color calibration.

There are two commonly used methods for measuring, and hence calibrating, color; the first method measures optical density (OD) values of a printed area and the second method measures a full spectral response of a printed area and therefore its CIE 1976 (L*, a*, b*) color space (also called CIELAB, whose coordinates are L*, a*, and b*) colorimetric coordinates.

Obtaining accurate color measurements typically depends on the precise positioning of the sensor over the printed area. Inaccurate position may result in the sensor not measuring accurately a consistent patch and may therefore lead to inaccurate or inconsistent measurements. Obviously, the accuracy requirements increase as the printed patches decrease in size. Since the press set-up state may degrade over time as consumables age and other process variables change, the resulting color may also alter over time. To prevent and control this color drift, and to increase color consistency both over time within a single press and job and across presses, a Continuous Color Calibration (CCC) process was developed in which a set of calibration patches is printed on each sheet in a job alongside the customer's content.

BRIEF DESCRIPTION OF THE DRAWINGS

Reference is made to the accompanying drawings, in which.

Figure 1:
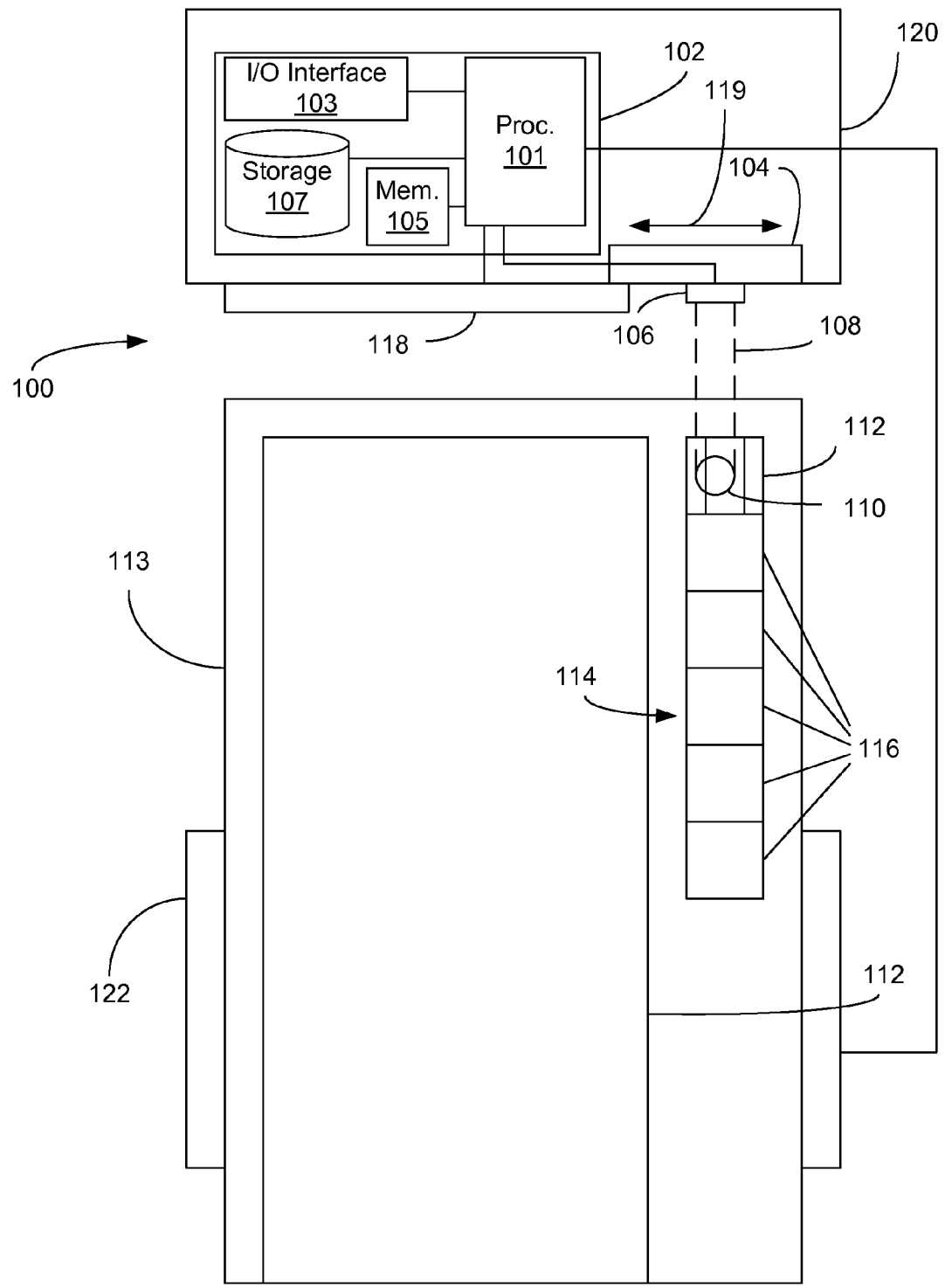
FIG. 1 illustrates a system for determining a position of a densitometer sensor with respect to a known position on a print for continuous self-calibration.

Reference numerals may be repeated among the drawings to indicate corresponding or analogous elements. Moreover, some of the blocks depicted in the drawings may be combined into a single function.

DETAILED DESCRIPTION

A system and method for determining a position of a densitometer sensor with respect to a known position on a print for continuous self-calibration is disclosed herein. Such system and method may facilitate precise sensor placement so as to maintain the sensor's field of view (also referred to as the spot of the sensor) within desired confines. A single position calibration patch may be used, thus allowing positioning self position calibration to be performed on virtually any printed sheet (or on any predefined number of printed sheets).

FIG. 1 illustrates a system 100 for determining a position of a densitometer sensor with respect to a known position on a print for continuous self-calibration.

Sheet 113 is presented in a facing orientation so as to present the features present on that sheet, while printer 120 is shown in a side view, but it is to be understood that optical sensor 106 is designed to scan across sheet 113 along scanning path 108 as sheet 113 (or printer 120) moves in the direction of scan.

System 100 may include printer 120, with printing assembly 118 (such as, for example one or more printing heads or a print drum) which are configured to print on sheet 113.

Sheet 113 may be, for example, a sheet fed from a tray carrying a stack of one or more sheets, a continuous sheet (also known as "web"), of any appropriate size, suitable for printing by printer 120.

Printing assembly 118 may typically be configured to print anywhere on sheet 113. Specifically, printing assembly 118 may be designed to print text, graphics or any printable items within designated printing area 112, as well as on any other areas on sheet 113.

Color calibration strip 114 may be provided on sheet 113, typically printed by printer 120 (but this is not a requirement, as it may be printed on sheet 113 by another printer or otherwise provided on sheet 113, and not necessarily by printer 120). Typically color strip 114 may include blocks 116 (also referred to as "patches") of different colors, which are used for color calibration or the like and are typically supposed to be sampled by optical sensor 106, such as, for example, a densitometer sensor (consider, as an example, densitometer model DTP24, marketed by X-Rite Inc., Grand Rapids, Mich., USA).

A densitometer is a device that measures the degree of darkness (also termed as "optical density") of a photographic or semitransparent material or of a reflecting surface. Densitometers are commonly used for color calibration. The aim of color calibration is to measure or adjust the color response of an input or output device (e.g. a printer) to establish a known relationship to a standard color space (e.g. CIELAB, CMYK, RGB).

Optical sensor 106 may be coupled to displacing member 104 (e.g. an electrical motor that is configured to engage with optical sensor 106 via a transmission gear), designed to move optical sensor 106 and position it at any desired position along axis 119, which is substantially perpendicular to scan path 108.

Position calibration patch 112 may be provided on sheet 113 at a known position with respect to a reference position. The reference position may be, for example, the position of color calibration strip 114, the position of a feature of color calibration strip 114 (e.g. the position of any of its color patches 116), or any other reference position.

Typically it is desired to have spot 110 of optical sensor 106 coincide with the color calibration strip, so as to allow effective sampling of the color patches of the strip. Thus, position calibration patch 112 may be positioned on sheet 113 anywhere along the scanning path 108. For example, position calibration patch 112 may be position in front color calibration strip 114, behind at any other position along it, as well as separately from color calibration strip 114.

In another embodiment, position calibration patch 112 may be positioned away from scan path 108 at a known position with respect to a reference position, but that would require that optical sensor 106 be provided with a displacing arrangement so as to allow its displacement with respect to sheet 113 (e.g. by displacing member 104) or that sheet 113 be provided with a displacing arrangement so as to allow its displacement with respect to sensor 106 (e.g. by moving feed tray 122 perpendicularly with respect to the scanning direction).

Printer 120 may include controller 102, which may include processor 101 for executing programs or process data, e.g. programs for executing a method for position calibration of the spot of a sensor, such as described herein and other such methods. The controller 102 may also include memory 105 for short term use, non-transitory storage device 107 for long-term storage of executable programs and data, and input/output (I/O) interface 103 for interfacing printer 120 with other input or output devices.

Figure 2:
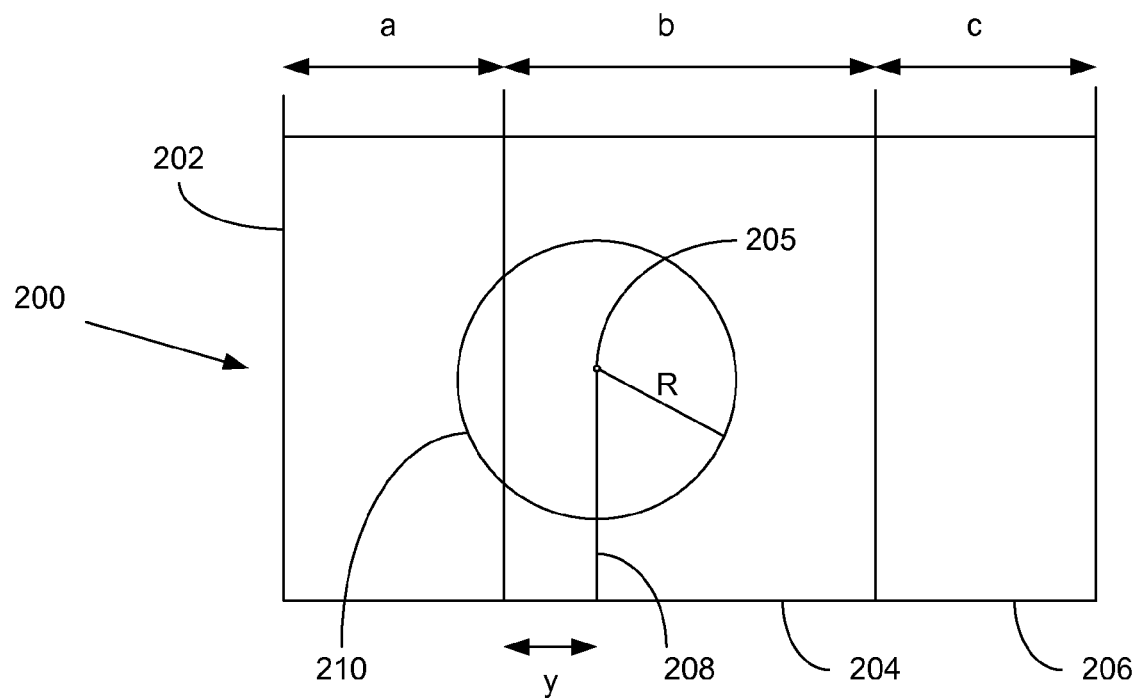
FIG. 2 illustrates a position calibration patch.

Reference is now made to FIG. 2 illustrating a position calibration patch.

Position calibration patch 200 may include two or more adjacent blocks (e.g. where each two adjacent blocks have a common edge) of different colors. In the example shown in FIG. 2, position calibration patch 200 includes three adjacent color blocks: a first side color block 202 located at a first lateral side of the position calibration patch, a second side color block 206 located at a second lateral side of the position calibration patch and a third intermediary color block 204 located between first side color block 202 and second side color block 206.

The lateral width (i.e. perpendicular to scanning path 108, shown in FIG. 1) of any or all of the color blocks of position calibration patch 200 may be selected so as to predetermine all possible coverage possibilities of the color blocks by spot 210 of the optical sensor (106, FIG. 1). The center of the spot is denoted by 205. For example, width b of intermediary color block 204 may be selected to be slightly greater than the lateral width of spot 210 (which, in the case of a circle, is twice radius R), so that at any time spot 210 covers an area that is confined within intermediary color block or covers an area which includes a portion of intermediary color block 204 and either of the side color blocks (202, 206), but not both. This way a maximal signal is obtained when the sensor is perfectly centered over the intermediary color block, avoiding nonlinear edge effects. The lateral widths a and c of side color blocks 202 and 206 (respectively) may be, in this example, of any size (i.e., smaller or greater than lateral width b).

Position calibration patch 200 may present blocks of different colors. The different colors may comprise the primary colors of a selected color space (e.g. Cyan, Magenta, Yellow and Black for the CMYK color space). Although other different colors may be used, it may be advantageous to select primary colors, so as to allow the optical sensor to clearly distinct them.

In some embodiments a position calibration patch may include just two color blocks.

In other embodiments a position calibration patch may include two color blocks provided on the sheet, while the background color of the sheet serves as a third color block.

Figure 3:
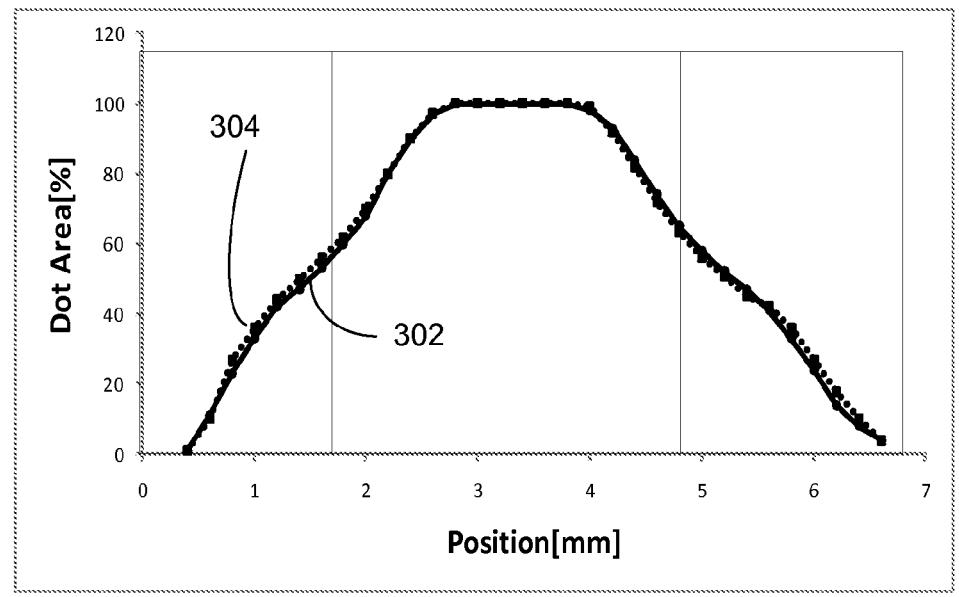
FIG. 3 is a line chart of optical density values sampled by an optical sensor vs. position of the sensor with respect to a position calibration patch.

FIG. 3 is a line chart of optical density values sampled by an optical sensor vs. position of the sensor with respect to a position calibration patch. Shown are normal (continuous line 302) optical density readings and high optical density readings (dashed line 304), indicating the relative coverage of magenta in the position calibration patch of FIG. 2 (in percentage) with respect to the position of the optical sensor (in mm). "Normal" optical density (OD) refers to an OD value which is set to the ink OD set-point value. This value is typically fixed and predetermined according to the ink properties and the gloss level of the substrate on which it is printed on. "High" OD refers an OD value which is higher than the specific ink's OD set-point.

The "position" refers to the position of the center of the sensor spot (205, see FIG. 2).

In order to test the accuracy of a position calibration method, the position calibration patch was printed and sampled twice using two different OD values, "Normal OD" which is the regular set point for each solid and "High OD" which is higher than the solids OD regular set points. These tests were conducted on an offline robot. As shown in FIG. 3, the output is a function that maps the sensor's position with respect to the relative coverage of Magenta by the sensors spot. Using this function, it may be possible to determine the position of the sensor (actually the spot of the sensor). In some embodiments, the sensor may be moved so as to obtain a desired position accordingly.

It is evident from the chart that the OD readings are not the same for same relative coverage of magenta and cyan compared with the same relative coverage of magenta and yellow. The reason for this specific configuration of the colors lies in their absorption spectrum. Magenta absorbs light in the central region of the visible wavelength whereas Yellow and Cyan absorb light in the shorter and longer wavelength regions, respectively. Thus it is possible to distinguish a state where the spot covers magenta and yellow from a state where the spot covers magenta and cyan, even when the same relative coverage of magenta is maintained. This way, only two colors participate in the sampling process at a time.

A method or system for position calibration is based on calculating the Magenta and Cyan (or Yellow) coverage within the measured area of the sensor's spot. Knowing the relative coverage (i.e. Magenta coverage with respect to the spot containing the two participating colors allow a rather accurate determination of the sensor's spot position over the patch and therefore, over an entire color calibration strip aligned with the position calibration patch.

Methods and systems for position calibration make use of the minimal overlapping of the absorption wavelengths of the three optical density response filters.

Specifically, the relation between the dot area (DA), which is the relative area inside the sensor's spot (its measurements aperture) occupied by magenta and the optical density sampled by the optical sensor, according to the Murray Davis model, is given by:

$$DA = \frac{10^{-OD_{cyan/yellow}} - 10^{-OD_{sample}}}{10^{-OD_{cyan/yellow}} - 10^{-OD_{magenta}}} \quad (1)$$

where $OD_{cyan/yellow}$ is the optical density of cyan or yellow, $OD_{magenta}$ is the optical density of magenta, and $OD_{sample}$ is the optical density of the sampled position calibration patch. In this above equation all OD values were taken from the Magenta response filter only.

Thus, it is possible to determine from the sampled position calibration patch the relative coverage of the spot of the sensor over the color blocks of the position calibration patch.

Next, based on the known geometry of the spot and on the determined relative coverage, the position of the optical sensor with respect to the reference position may be determined. The term "known geometry" is understood, in the context of the present application, to include the shape and dimensions of the spot.

This may be demonstrated by considering the position calibration patch shown in FIG. 2, and the optical sensor spot that has in that case a circular shape. For this set up, the following relation may be used, defining the relation between DA, radius R of the spot and distance y, which is, in this example, the distance between the border line between magenta and cyan (that may serve as a reference position) and the center of the circular spot:

$$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right] \quad (2)$$

Note that equation (2) corresponds to a circular spot having radius R and to a position calibration patch with color blocks that share a linear border line. A spot and/or position calibration patch of other geometric properties may require the use of another equation defining the proper relation between the position of the spot (i.e. the position of the optical sensor) and DA.

Figure 4:
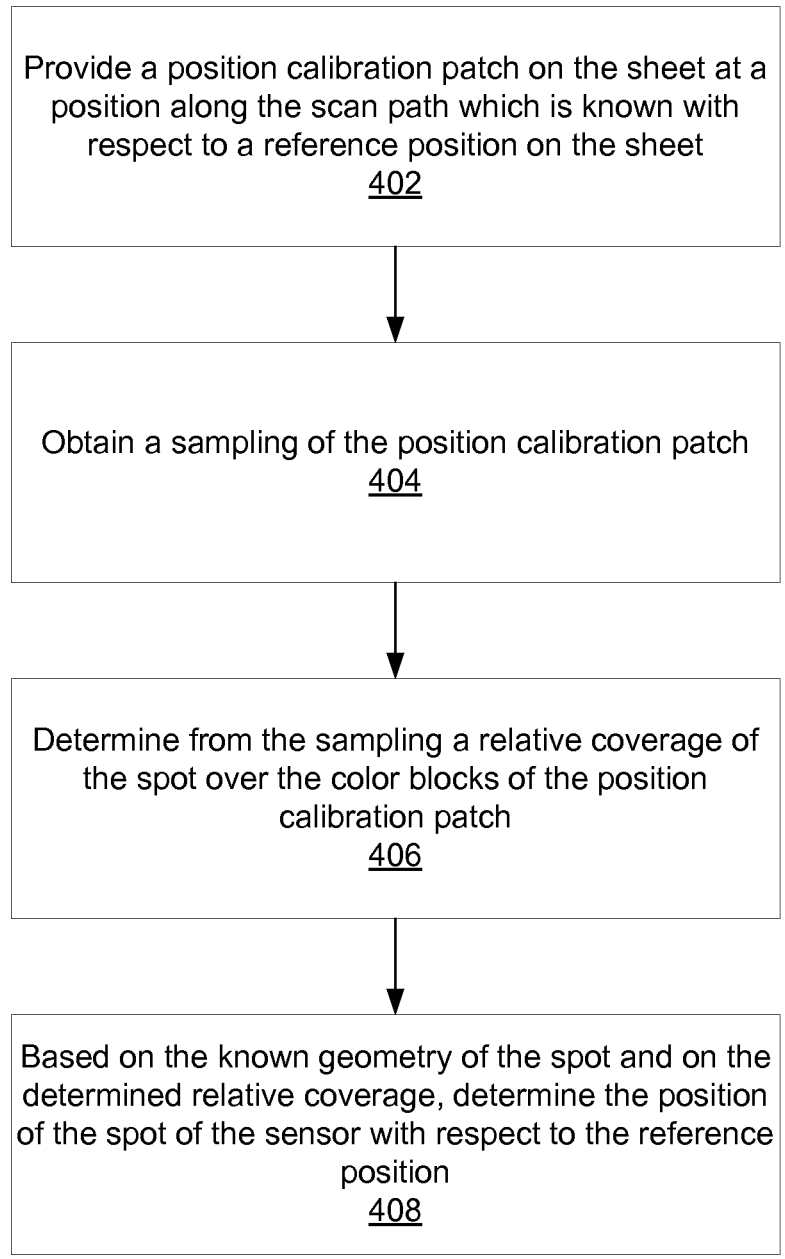
FIG. 4 illustrates a method for determining a position of a spot of an optical sensor of a known geometry traveling along a scan path across a sheet, with respect to a reference position on the sheet.

FIG. 4 illustrates a method 400 for determining a position of a spot of an optical sensor of a known geometry traveling along a scan path across a sheet, with respect to a reference position on the sheet. By "traveling" it is meant to refer to a situation where the sensor is stationary and the sheet is travelling, a situation where the sheet is stationary and the sensor is traveling and a situation where both the sheet and the sensor are traveling, all which create a relative motion between the sensor (or the spot of the sensor) and the sheet, effectively causing the spot to travel along the scan path across the sheet.

Such a method may generally include providing 402 a position calibration patch on the sheet at a position along the scan path which is known with respect to the reference position, the patch comprising at least two blocks of different colors. The method may also include obtaining 404 a sampling of the position calibration patch using the optical sensor. The method may further include determining 406 from the sampling a relative coverage of the spot over the color blocks of the position calibration patch and based on the known geometry of the spot and on the determined relative coverage, determining 408 the position of the spot of the sensor with respect to the reference position.

A method for determining the position of a spot of an optical sensor with respect to the reference position on the sheet may be used to continuously self-calibrate the cross-process position of an in-line densitometer sensor in the output print path of a high speed digital press. For example, a position calibration patch may be provided periodically along the scan path of the optical sensor. In some embodiments a position calibration patch may be provided in front or within each color calibration strip of a plurality of color calibration strips provided on a sheet, when the existence of a plurality of jobs requires the use of a plurality of color calibration strips.

A method and system for position calibration may rely solely on the sampled optical density values, and is based on the analysis of the optical properties of the position calibration patch and the geometrical properties of the sensor's spot. Such method or system is general enough to be embedded into or integrated with practically any printing device.

Simple sampling, as described hereinabove, facilitates performing position calibration for the sensor's spot continuously for each printed sheet, thus allowing color calibration patches to share the same spread with the position self-calibration pattern.

A method and system for determining a position of a spot of an optical sensor of a known geometry traveling along a scan path across a sheet, with respect to a reference position on the sheet, do not require the use of additional optical devices such as camera, scanner or a barcode reader, rendering such method and system less expensive than methods and systems that use additional optical devices.

A method and system for determining a position of a spot of an optical sensor of a known geometry traveling along a scan path across a sheet seem also superior to another known solution for determining the position of the leading edge of the sheet, which involves using a low cost tracking sensor configured to track the leading edge only, which is prone to mis-registration due to misalignment between the sheet and the printed image on it.

Employing a method (or system) for position calibration of the spot of the sensor may yield some advantages, among which are:

1. Use of only a single position calibration patch allows continuously determining the position of the spot of the sensor for every printed sheet and thus facilitates online calibration of the position of the sensor.

2. Calibration methods for determining a position of a spot of an optical sensor of a known geometry traveling along a scan path across a sheet may involve little, if any hardware adjustment in existing printers, since they may be applied as algorithmic solutions embedded in machines with existing sensors.

3. A position calibration patch may be printed alongside the regular (customer's) printed job, so that it does not interrupt the regular run of that job.

Aspects of the invention may be embodied in the form of a system, a method, or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for position calibration of a spot of a known geometry of an optical sensor, the method comprising:
   providing a position calibration patch on a sheet at a position which is known with respect to a reference position on the sheet, along a scan path of the spot across the sheet, the patch comprising at least two adjacent blocks of different colors;
   displaying the spot on the position calibration patch;
   obtaining a sampling of the position calibration patch and the spot using the optical sensor;
   determining from the sampling a relative coverage of the spot on each of the at least two adjacent blocks of different colors of the position calibration patch; and
   based on the known geometry of the spot and on the determined relative coverage, determining the position of the spot of the sensor with respect to the reference position.

2. The method of claim 1, wherein the position calibration patch comprises three adjacent blocks of different colors.

3. The method of claim 2, wherein the three adjacent blocks of different colors comprise a first side color block located at a first lateral side of the position calibration patch, a second side color block located at a second lateral side of the position calibration patch and a third intermediary color block located between the first side color block and the second side color block, wherein a lateral width of the spot of the sensor is smaller than a lateral width of the intermediary color block.

4. The method of claim 3, wherein determining from the sampling the relative coverage of the spot comprises using the following equation:

$$DA = \frac{10^{-OD_{cyan/yellow}} - 10^{-OD_{sample}}}{10^{-OD_{cyan/yellow}} - 10^{-OD_{magenta}}},$$

where DA is the relative area of the spot covering magenta, $OD_{cyan/yellow}$ is the optical density of cyan or yellow, $OD_{magenta}$ is the optical density of magenta, and $OD_{sample}$ is the optical density of the sampling.

5. The method of claim 4, wherein the spot is circular, and wherein determining the position of the spot of the sensor with respect to the reference position comprises using the equation:

$$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right],$$

where DA is the relative area of the spot covering one of the different colors, R is the radius of the spot and y is the distance between a border between the block of said one of the different colors and an adjacent block color and the center of the spot.

6. The method of claim 1, wherein the different colors are primary colors of a color space.

7. The method of claim 1, wherein the reference position comprises a color calibration strip.

8. The method of claim 1, further comprising:
obtaining another sampling of the position calibration patch and the spot using the optical sensor;
determining from the another sampling another relative coverage by the spot on each of the at least two adjacent blocks of different colors of the position calibration patch; and
based on the known geometry of the spot and on the determined another relative coverage, determining another position of the spot of the sensor with respect to the reference position.

9. A non-transitory computer readable medium containing instructions for position calibration of a spot of a known geometry of an optical sensor, that when executed cause a processor to:
provide a position calibration patch on a sheet at a position which is known with respect to a reference position on the sheet, along a scan path of the spot across the sheet, the patch comprising at least two adjacent blocks of different colors;
display the spot on the position calibration patch;
obtain a sampling of the position calibration patch and the spot using the optical sensor;
determine from the sampling a relative coverage of the spot on each of the at least two adjacent blocks of different colors of the position calibration patch; and
based on the known geometry of the spot and on the determined relative coverage, determine the position of the spot of the sensor with respect to the reference position.

10. The non-transitory computer readable medium of claim 9, wherein the position calibration patch comprises three adjacent blocks of different colors.

11. The non-transitory computer readable medium of claim 10, wherein the three adjacent blocks of different colors comprise a first side color block located at a first lateral side of the position calibration patch, a second side color block located at a second lateral side of the position calibration patch and a third intermediary color block located between the first side color block and the second side color block, wherein a lateral width of the spot of the sensor is smaller than a lateral width of the intermediary color block.

12. The non-transitory computer readable medium of claim 11, wherein to determine from the sampling the relative coverage of the spot, the instructions are executed to cause the processor to use the following equation:

$$DA = \frac{10^{-OD_{cyan/yellow}} - 10^{-OD_{sample}}}{10^{-OD_{cyan/yellow}} - 10^{OD_{magenta}}},$$

where DA is the relative area of the spot covering magenta, $OD_{cyan/yellow}$ is the optical density of cyan or yellow, $OD_{magenta}$ is the optical density of magenta, and $OD_{sample}$ is the optical density of the sampling.

13. The non-transitory computer readable medium of claim 12, wherein the spot is circular, and wherein to determine the position of the spot of the sensor with respect to the reference position, the instructions are executed to cause the processor to use the equation:

$$DA = 0.5 - \frac{1}{\pi} \cdot \sin^{-1}\left(\frac{y}{R}\right) - \left[\frac{R}{\pi} \cdot \sqrt{1 - \left(\frac{y}{\pi}\right)^2}\right],$$

where DA is the relative area of the spot covering one of the different colors, R is the radius of the spot and y is the distance between a border between the block of said one of the different colors and an adjacent block color and the center of the spot.

14. The non-transitory computer readable medium of claim 9, wherein the different colors are primary colors of a color space.

15. The non-transitory computer readable medium of claim 9, wherein the reference position comprises a color calibration strip.

16. The non-transitory computer readable medium of claim 9, wherein the instructions are executed to cause the processor to:
obtain another sampling of the position calibration patch and the spot using the optical sensor, determine from the another sampling another relative coverage by the spot on each of the at least two adjacent blocks of different colors of the position calibration patch, and determine another position of the spot of the sensor with respect to the reference position.

17. A data processing system for position calibration of a spot of a known geometry of an optical sensor, the system comprising:
a processing unit in communication with a computer readable medium, wherein the computer readable medium contains a set of instructions wherein the processing unit is designed to carry out the set of instructions to:

provide a position calibration patch on a sheet at a position which is known with respect to a reference position on the sheet, along a scan path of the spot across the sheet, the patch comprising at least two adjacent blocks of different colors;

display the spot on the position calibration patch;

obtain a sampling of the position calibration patch using the optical sensor;

determine from the sampling a relative coverage of the spot on each of the at least two adjacent blocks of different colors of the position calibration patch; and based on the known geometry of the spot and on the determined relative coverage, determine the position of the spot of the sensor with respect to the reference position.

18. The system of claim 17, further comprising a printer to print the position calibration patch on the sheet.

19. The system of claim 18, wherein the sensor is a densitometer.

20. The system of claim 18, wherein the densitometer is incorporated with the printer.

* * * * *